May 16, 1933. H. SCHIMMEL 1,909,226
METHOD OF AND APPARATUS FOR MACHINING ROLLS FOR ROLLING MILLS
Filed Dec. 22, 1931 3 Sheets-Sheet 1
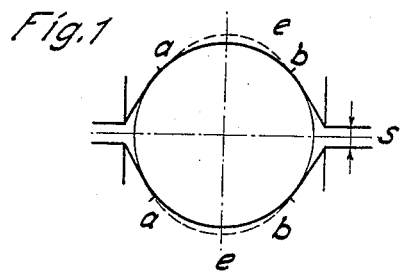
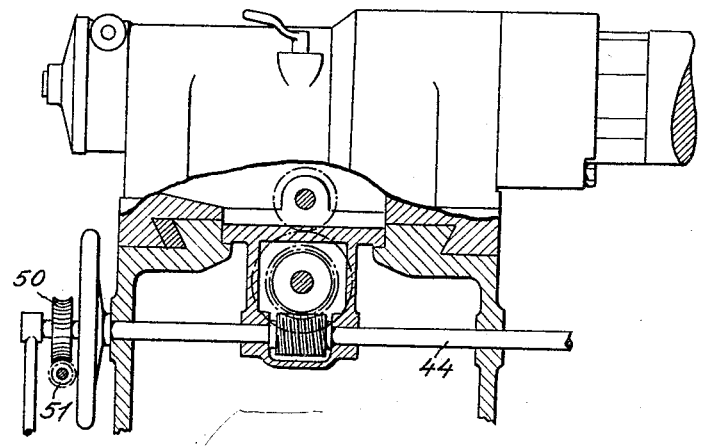
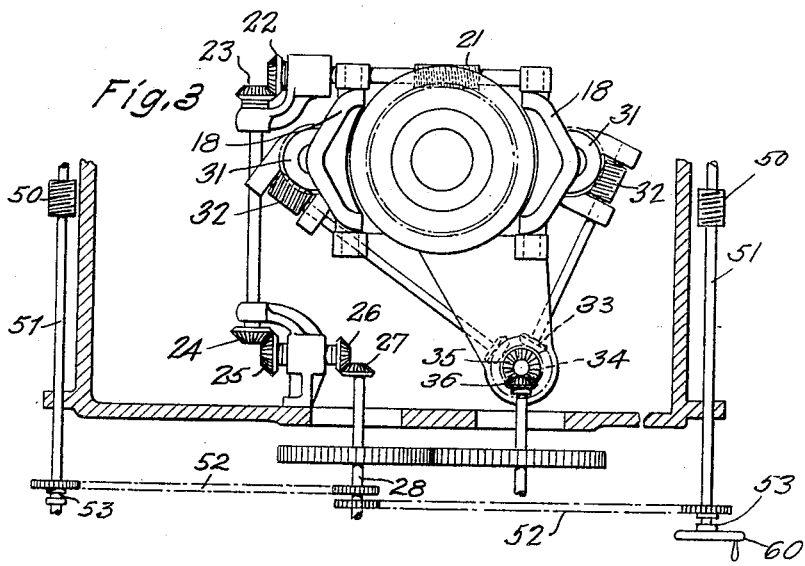
INVENTOR
HANS SCHIMMEL
by his attorneys
Howson and Howson

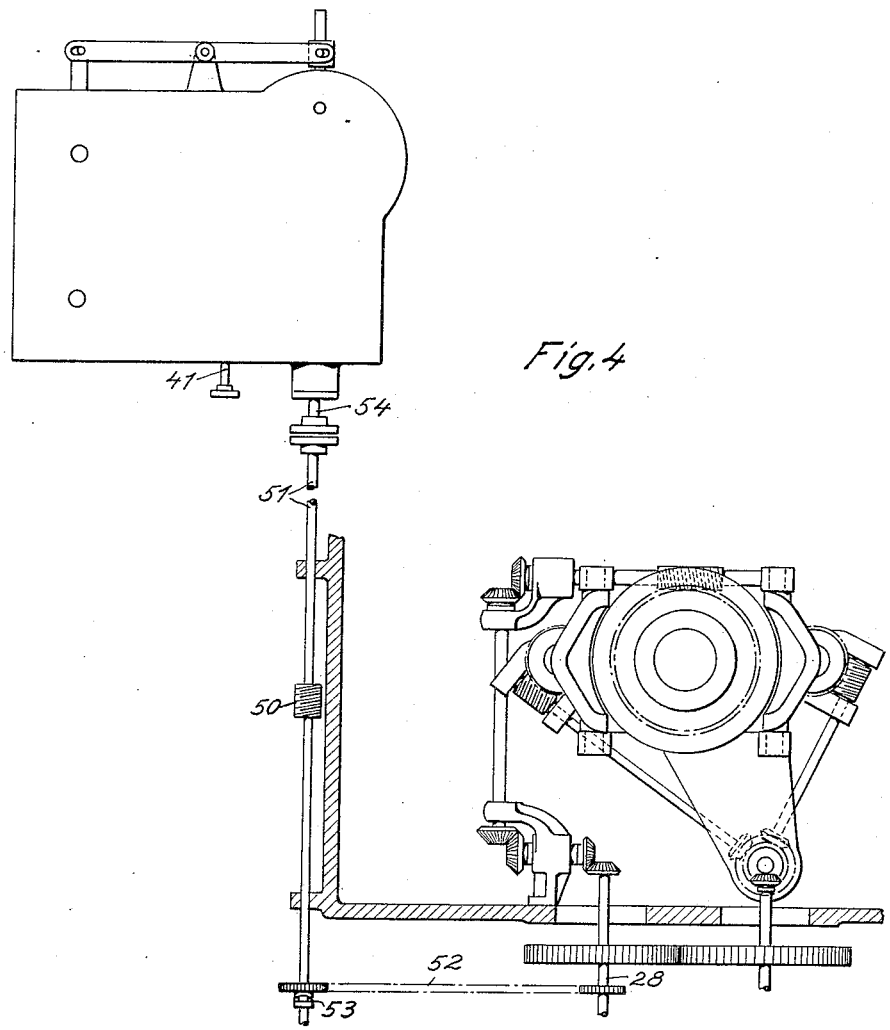

INVENTOR
HANS SCHIMMEL
by his attorneys
Howson and Howson

Patented May 16, 1933

1,909,226

UNITED STATES PATENT OFFICE

HANS SCHIMMEL, OF KOMOTAU, CZECHOSLOVAKIA

METHOD OF AND APPARATUS FOR MACHINING ROLLS FOR ROLLING MILLS

Application filed December 22, 1931, Serial No. 582,596, and in Germany February 23, 1931.

This invention relates to an improvement in or a modification of the method of and apparatus for machining rolls for rolling mills and the like.

My older specification Ser. No. 514,620 describes apparatus for machining circumferential grooves in Pilger and like rolls in which a tool holder is arranged to extend between a pair of rolls mounted on the machine and is subjected to periodical radial displacement as the tool holder rotates whilst a tool therein effects cuts across the peripheral faces of the rolls. The radial displacements of the tool holder are arranged to effect, in conjunction with the rotational movement thereof, the cutting of the inclined side portions of the grooves in the rolls. The rolls are rotated slightly between successive cuts of the tool in order to feed the work to the tool.

According to this invention each roll is subjected to displacement in a direction transverse to the axis thereof during the machining operations in order to produce variations from a purely circular contour of the groove effected by unmodified rotation of the tool holder.

In order that the invention may be fully understood, reference is directed to the accompanying drawings, in which:—

Figure 1 is a diagram of the sections of the grooves in a pair of juxtaposed rolls illustrating the method of machining the same in accordance with this invention, Figure 2 is a vertical sectional view of an apparatus constructed in accordance with this invention.

Figure 3 is a sectional plan of another portion thereof.

Figure 4 is a plan servo motor, as added to Figure 3, and

Figure 5:
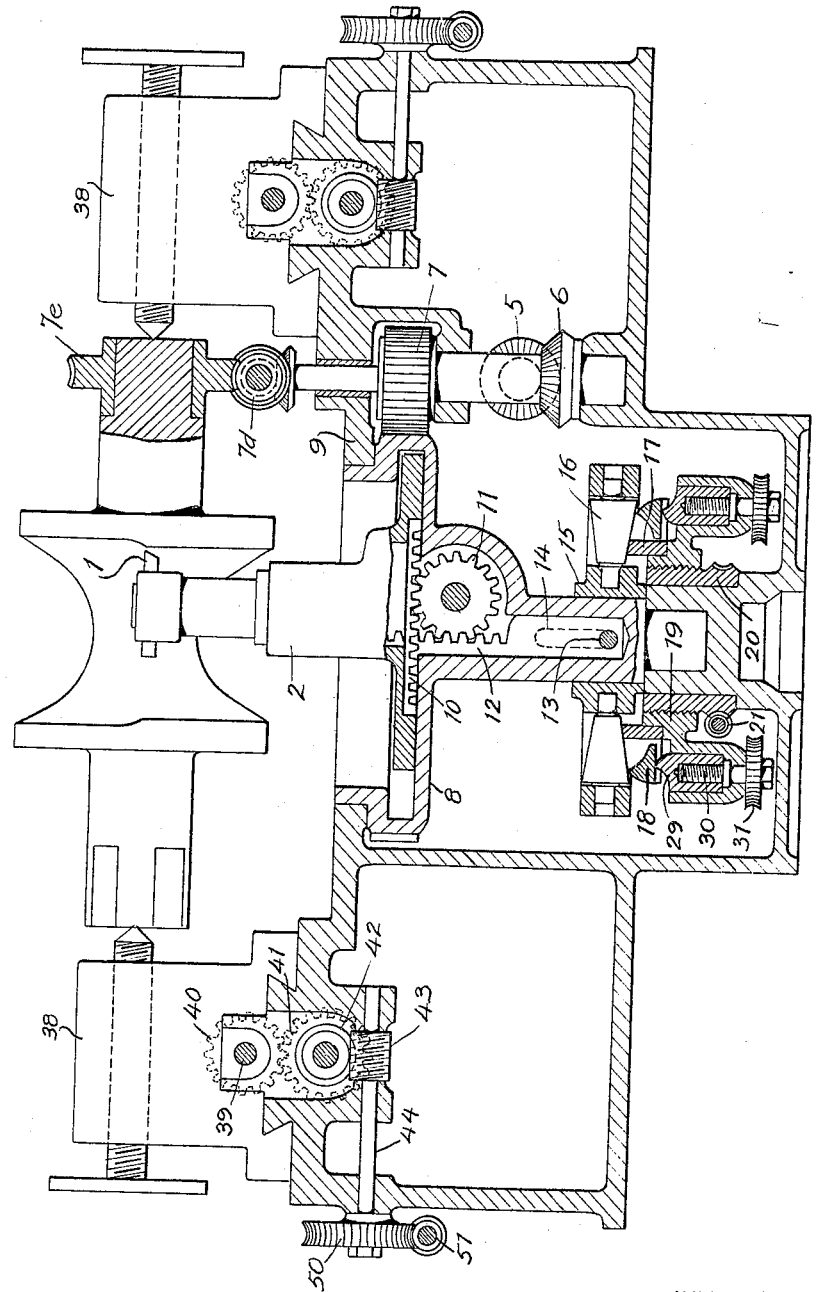
Figure 5 is an elevation of the means for supporting the rolls, also showing the tool holder, and partly in vertical longitudinal section through the control mechanism therefor.

Referring to Figure 5, a tool 1 is secured in a tool holder 2 which is arranged to be rotated by means of bevel gears 5 and 6 and a gear wheel 7 arranged in mesh with a ring of teeth provided upon the exterior of the upper portion of a rotatable arbour 8 arranged to carry the tool holder 2. The said tool holder is mounted in the enlarged upper portion of the arbour 8 so as to be movable relatively thereto in a radial direction of the said arbour.

The upper portion of the arbour 8 is rotatably mounted in a fixed housing 9. The radial movement of the tool holder 2 is effected during the rotary movements of the arbour 8 by mechanism illustrated in Figure 5, which is located interiorly of the said arbour. The said mechanism consists of a horizontally disposed toothed rack 10 secured to the tool holder 2, a toothed wheel 11 arranged in mesh therewith and with a further toothed rack 12 constituting a driving rod for the said mechanism.

The actuation of the rack 12 is effected by means of rising and falling movements of a pin 13 secured to the said rack and the ends of which extend through diametrically opposed slots 14 formed in the arbour 8, the said ends being secured to a cage 15 arranged to surround the said arbour. The cage 15 is slidably arranged on the arbour 8 and is arranged to be moved vertically under the control of means hereinafter described, arranged to act upon two rollers 16 mounted in the said cage.

The pin 13 in addition to transmitting the rising and falling movements of the cage 15 to the rack 12, is arranged to transmit rotary motion from the arbour 8 to the cage 15, but if desired, a coupling, other than the pin 13, may be arranged between the arbour 8, and the cage 15, so that the correct rising and falling movements of the cage relative to the arbour are not disturbed by a binding action of the pin 13 in the slots 14.

The holder 19 is provided with an internal screw thread arranged in engagement with a corresponding screw thread formed externally upon an upward extension of a worm wheel 20 rotatably mounted upon a bearing provided on the casing of the mechanism and arranged in mesh with a worm 21. Rising and falling movements of the holder 19 are effected by rotation of the worm wheel 20 by means of the worm 21. The worm 21 is carried by a spindle rotatably mounted in bearings on the frame of the mechanism to which rotary motion is imparted through the medium of a train of bevel wheels 22, 23, 24, 25, 26, 27, the bevel wheel 27 being mounted upon one end of a rotatable spindle 28.

The sleeves 29 are each provided with an internally screw threaded hole with which a correspondingly screw threaded spindle 30 is arranged in engagement.

Each spindle 30 is rotatably mounted in a bearing formed in the holder 19 and is arranged to extend below the said holder and is provided with a worm wheel 31 keyed thereto. A worm 32 is arranged in mesh with each of the worm wheels 31 and is arranged to be rotated through the medium of a train of bevel wheels 33, 34, 35, 36, the bevel wheel 36 being secured to one end of a rotatable spindle 37.

The roll or rolls to be machined are supported on headstocks 38, movable perpendicularly to their axis corresponding to the different diameters of the rolls to be worked. For each roll, a worm 7d meshes with a worm wheel 7e placed on the roll pin, and gives the roll a feeding movement.

Mechanism is provided to enable each pair of headstocks 38 to be moved together so that a roll supported thereby is moved transverse to its axis in a horizontal direction. This mechanism comprises a pair of screwed spindles 39 each arranged to extend through and to engage with a correspondingly internally screw threaded hole in one of the headstocks 38, each spindle 39 being fixed axially to the machine bed so that rotation of the said spindle effects movement of the corresponding headstock 38.

A gear wheel 40 is keyed to the spindle 39 and is arranged in mesh with a gear wheel 41 forming one of a train of gearing, the other members of which comprise a worm wheel 42 and worm 43 carried by a spindle 44.

Referring to Figure 1, the contour of the grooves machined in accordance with the method described in the parent specification are represented by full lines, each groove consisting of a circular central portion and two inclined side portions.

In accordance with this invention, the rolls may be moved towards or away from one another so that the gap between the rolls may be varied during the machining operations. These movements of the rolls may also be employed for producing annular depressions as indicated at $e$ extending from $a$ to $b$ in the otherwise circular central portions of the grooves in the rolls.

The movements of the rolls towards and away from one another are effected by the apparatus illustrated in Figures 2 and 3.

Referring to Figure 2, one head stock is illustrated constructed in accordance with my older specification, which is arranged to support one end of a roll, the said head stock being arranged to be movable in a direction transverse to the axis of the roll. The head stocks of each pair arranged to support a roll are displaceable together through the medium of worm gear coupled to a spindle 44 as described in the parent specification. In the apparatus according to my older specification, all the head stocks arranged to support a pair of rolls are coupled together and the two pairs are operable to be moved towards or away from one another by means of a hand wheel.

In accordance with the present invention each of the spindles 44 is coupled by a worm and worm wheel 50 to a spindle 51 which is coupled by chain drive 52 to a spindle 28. The spindle 28 is operable to control the effective cutting radius of the tool in the tool holder of the machine in the manner described in my older specification. By this construction, the gap $s$ between the rolls is varied in accordance with the radial setting of the tool in the tool holder. A coupling 53 is provided which is operable to disconnect the chain drive 52 from the spindle 51.

The spindle 51 may be arranged to be rotated in any desired manner, for example by a hand wheel 60, Fig. 3, or by means of templates and servo motor apparatus, Fig. 4, so as to control the movements of the rolls towards and away from one another as the tool holder rotates and effect the machining of the annular depressions $e$ above described.

The coupling 53 is disconnected, when the spindle 51 is operated by a hand wheel or a crank lever.

Fig. 4 illustrates an arrangement in which a template and a servo motor apparatus are used as described in my older specification Ser. No. 579,761. The spindle of my present apparatus is connected with the spindle 54 of the servo motor apparatus and the spindle 41 of this apparatus is connected with the driving spindle of the Pilger rolls travel mechanism.

It will be appreciated that the spindle 51 may be controlled so as to produce more than one depression $e$ in the groove in a roll and that such depression may have any desired configuration.

I claim:

1. A method of machining the circumferential portions of rolls, for example, rolls for Pilger rolling mills, which consists in subjecting a roll to cuts axially thereof from an edge cutting tool as the tool rotates and moves in a plane substantially parallel to or coincident with a plane extending through the axis of rotation of the roll and as said roll is moved towards and away from said tool in a direction transverse to the axis of said roll so that the path of the tool relatively to the roll conforms to the contour of the desired cross section of the roll, and feeding the roll to the tool between successive cuts thereof by rotating the roll.

2. A method of machining the circumferential portions of rolls, for example, rolls for Pilger rolling mills which consists in subjecting a pair of rolls arranged in side by side relationship with one another and with their axes parallel, to cuts axially thereof from an edge cutting tool as the tool rotates and moves between the rolls in a plane substantially parallel to or coincident with the plane extending through the axes of the said rolls and as said rolls are moved towards and away from said tool in directions transverse to the axes of both said rolls so that the path of the tool relatively to the rolls conforms to the contour of the desired cross section of each of said rolls and feeding the rolls to the tool between successive cuts thereof by rotating the rolls.

3. In an apparatus for machining the circumferential portions of rolls of the type described the combination of means for supporting at least one roll to be machined, a tool holder rotatable about an axis disposed transversely to the axis of a roll located in said supporting means, means operable automatically to move said tool holder radially with respect to the axis of rotation thereof as said tool holder rotates and means operable automatically to move said roll supporting means towards and away from said tool holder as the same rotates.

4. In an apparatus for machining the circumferential portions of rolls of the type described, the combination of means for supporting at least one roll to be machined, a tool holder rotatable about an axis disposed transversely to the axis of a roll supported by said means, means operable automatically to move said tool holder radially with respect to the axis of rotation thereof as said tool holder rotates, mechanism operatively connected to said means for moving the tool holder radially and operable to vary the mean effective radial location of said tool holder relatively to the axis of rotation thereof, means operable automatically to move said roll supporting means towards and away from said tool holder and an operative driving connection between the last said means and said mechanism for varying the radial location of said tool holder.

5. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axis of said rolls, means operable automatically to move said tool holder radially with respect to the axis of rotation thereof as the same rotates, and means operable automatically to move said roll supporting means towards and away from said tool holder as the same rotates.

6. In an apparatus for machining the circumferential portions of rolls of the type described, the combination of means for supporting at least one roll to be machined, an arbour rotatably mounted about an axis disposed transversely to the axis of a roll supported by said means, means for rotating said arbour, a tool holder operatively connected to said arbour so as to rotate therewith and movable radially thereon with respect to the axis of rotation of said arbour, means operable automatically to effect said radial movements of said tool holder as the same rotates, and means operable automatically to move said roll supporting means towards and away from said tool holder.

7. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and movable radially thereon with respect to the axis of rotation of said arbour, mechanism disposed within said arbour for moving said tool holder radially of said arbour and an operative connection between said mechanism and controlling means arranged exteriorly of said arbour adapted to control radial movements of said tool holder as the same rotates and means operable automatically to move said roll supporting means towards and away from said tool holder as the same rotates.

8. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour and an operative connection between the ends of said pin and mechanism arranged exteriorly of said arbour adapted to control the radial movements of said tool holder as the same rotates and means operable automatically to move said roll supporting means towards and away from said tool holder.

9. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged around said arbour and slidable axially thereon, means for rotating said cage with said arbour, an operative connection between said pin and said cage, at least one cam arranged to control said cage as the same rotates to move the same axially with respect to said arbour and thereby effect said radial movement of said tool holder as the same rotates, and means operable automatically to move said roll supporting means towards and away from said tool holder.

10. In an apparatus for machining the circumferential portions of rolls of the type described, the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed therein, a cage surrounding said arbour and slidable axially thereon, means for rotating said cage with said arbour, an operative connection between said pin and said cage, a ring member arranged to surround said arbour and at least a pair of cams diametrically disposed with respect to said arbour, said ring and said cams being operable to engage with said cage and operable to effect movement thereof in at least one direction axially of said arbour as the same rotates and thereby effect said radial movement of said tool holder as the same rotates and means operable automatically to move said roll supporting means towards and away from said tool holder.

11. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage arranged around said arbour and slidable axially thereon, means for rotating said cage with said arbour, a ring member arranged to surround said arbour and at least a pair of cams diametrically disposed with respect to said arbour, said ring and said cams being operable to engage with said cage and effect movement thereof in one direction axially of said arbour and a yielding control arranged to effect movement of said cage in the other direction for the purpose specified and means operable automatically to move said roll supporting means towards and away from said tool holder.

12. In an apparatus for machining the circumferential portions of rolls of the type described, the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack dsiposed axially of said arbour and arranged in mesh with said gear wheel, an operative connection between said second rack and a cage surrounding said arbour and slidable thereon, means for rotating said cage with said arbour, a ring member arranged to surround said arbour and at least a pair of cams diametrically disposed with respect to said arbour, said ring and said cams being operable to engage with said cage and effect movement thereof in one direction axially of said arbour as the same rotates and a yielding control arranged to effect movement of said cage in the other direction for the purpose specified, mechanism operatively connected to said ring and mechanism operatively connected to said cams for moving said ring and said cams relatively to said arbour in an axial direction thereof, means operable automatically to move said roll supporting means towards and away from said tool holder and operative driving connections between last said means and said mechanism for moving said ring and said cams.

13. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage surrounding said arbour and movable axially thereof, means for rotating said cage with said arbour, a ring member arranged to surround said arbour and at least a pair of cams diametrically disposed with respect to said arbour, said ring and said cams being operable to engage with said cage and effect movement thereof in one direction axially of said arbour as the same rotates, means adapted to effect movement of said cage in the other direction for the purpose specified, a non-rotatable support for the said ring and said cams, a screw-threaded bore in said support arranged to engage with a correspondingly screw-threaded sleeve axially aligned with said arbour and maintained against axial displacement, gear mechanism for rotating said sleeve, means operable automatically to move said roll supporting means towards and away from said tool holder and an operative connection between last said means and said gear mechanism for rotating said sleeve.

14. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith, and slidable in guides thereon radially with respect to the axis of rotation of said arbour, a rack on said tool holder disposed transversely to the axis of said arbour arranged in mesh with a gear wheel rotatably mounted in said arbour, a second rack disposed axially of said arbour and arranged in mesh with said gear wheel, an operative connection between said second rack and a cage arranged exteriorly of said arbour and movable axially thereof, means for rotating said cage with said arbour, a ring member arranged to surround said arbour and carried by a supporting member, at least a pair of segmental cams diametrically disposed with respect to said arbour and pivotally mounted at their ends to said ring supporting member, gear mechanism for rocking said cams about their pivots in the axial direction of said arbour, said ring and said cams being operable to engage with said cage and effect movement thereof in one direction axially of said arbour and means operable to effect movement of said cage in the other direction for the purpose specified, a screw-threaded bore in said ring supporting member arranged in engagement with a corresponding screw-threaded sleeve maintained against axial displacement, gear mechanism for rotating said sleeve, means operable automatically to move said roll supporting means towards and away from said tool holder and an operative driving connection between last said means and said gear mechanisms for rocking said cams and rotating said sleeve.

15. In an apparatus for machining the circumferential portions of rolls of the type described, the combination of means for supporting at least one roll to be machined, an arbour rotatable about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder and adapted to control said radial movements as the tool holder rotates, an operative connection between said mechanism and a cage rotatable with and movable axially relatively to said arbour, a ring member arranged to surround said arbour and at least a pair of segmental cams diametrically disposed with respect to said arbour, said ring and said cams being operable to engage with said cage and effect movement thereof in at least one direction axially of said arbour as the same rotates and thereby effect said radial movement of said tool holder and means operable automatically to move said roll supporting means towards and away from said tool holder.

16. In an apparatus for machining the circumferential portions of rolls of the type described, the combination of means for supporting at least one roll to be machined, an arbour rotatable about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder adapted to control said radial movements thereof as the same rotates, an operative connection between said mechanism and a cage rotatable with and movable axially with respect to said arbour, a ring member arranged to surround said arbour and at least a pair of segmental cams diametrically disposed with respect to said arbour, said ring and said cams being operable to engage with said cage and effect movement thereof in one direction axially of said arbour as the same rotates and means adapted to effect movement of said cage in the other direction and thereby effect corresponding radial movements of said tool holder, gear mechanism operatively connected to said ring and said cams for moving the same relatively to the said arbour in an axial direction thereof, means operable automatically to move said roll supporting means towards and away from said tool holder and an operative connection between the last said means and said gear mechanism.

17. In an apparatus for machining the circumferential portions of rolls of the type described, the combination of means for supporting at least one roll to be machined, an arbour rotatably mounted about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder and adapted to control said radial movements thereof as the same rotates, an operative connection between said mechanism and a cage rotatable with and movable axially with respect to said arbour, a ring member arranged to surround said arbour, a non-rotatable supporting member for said ring, at least a pair of segmental cams diametrically disposed with respect to the said arbour and pivotally mounted at their ends to said ring supporting member, gear mechanism for rocking said cams about their pivots, said ring and said cams being operable to engage with said cage and effect movement thereof in at least one direction axially of said arbour and thereby effect corresponding radial movements of said tool holder, gear mechanism operatively connected to said ring supporting member for moving the same axially of said arbour, means operable automatically to move said roll supporting means towards and away from said tool holder and an operative driving connection between the last said means and said gear mechanisms for rocking said cams and moving said supporting member.

18. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the plane extending through the axes of said rolls, means for moving said tool holder radially with respect to the axis of rotation thereof as the same rotates, and means operatively connected to said roll supporting means and operable automatically to effect movement of each roll towards and away from said tool holder in a direction transverse to the axes of said rolls.

19. In an apparatus for machining the circumferential portions of rolls of the type described, the combination of two pairs of head-stocks each arranged to support a roll to be machined with the axes of the said rolls disposed parallel to one another, feed mechanism operatively connected to said head-stocks and operable automatically to move each pair of head-stocks towards and away from the other pair in a direction transverse to the axis of a roll supported thereby, a hollow arbour rotatable about an axis disposed transversely to the plane extending through the axes of the rolls supported by said head-stocks means for rotating said arbour, a tool holder located between said rolls and operatively connected to said arbour so as to rotate therewith and slidable in guides radially with respect to the axis of rotation thereof, a rack on said tool holder disposed transversely to the axis of said arbour arranged in mesh with a gear wheel rotatably mounted in said arbour, a second rack disposed axially of said arbour and arranged in mesh with said gear wheel, an operative connection between said second rack and a cage surrounding said arbour, means for rotating said cage with said arbour, a ring member arranged to surround said arbour and carried by a non-rotatable supporting member, at least a pair of segmental cams diametrically disposed with respect to said arbour and pivotally mounted at their ends to said ring supporting member, gear mechanism for rocking said cams about their pivots in the axial direction of said arbour, said ring and said cams being operable to engage with said cage and effect movement thereof in at least one direction axially of said arbour and thereby effect radial movement of said tool holder, a screw-threaded bore in said ring supporting member arranged in engagement with a corresponding screw-threaded sleeve maintained against axial displacement, gear mechanism for rotating said sleeve, and an operative driving connection between both said gear mechanisms and said means for moving said head-stocks.

20. In an apparatus for machining the circumferential portions of rolls of the type described, the combination of two pairs of head-stocks each arranged to support a roll to be machined with the axes of the said rolls disposed parallel to one another, feed mechanism operatively connected to said head-stocks and operable automatically to move each pair of head-stocks towards and away from the other pair in a direction transverse to the axis of a roll supported thereby, a tool holder disposed between a pair of rolls supported by said head-stocks, means for rotating said tool holder about an axis disposed transversely to the plane extending through the axes of said rolls and mechanism operable automatically to move said tool holder radially with respect to the axis of rotation thereof as the same rotates.

21. In an apparatus for machining the circumferential portions of rolls of the type described, the combination of means for supporting at least one roll to be machined, a tool holder rotatable about an axis disposed transversely to the axis of a roll supported by said means, mechanism operable automatically to move said tool holder radially with respect to the axis of rotation thereof as the tool holder rotates and servo-motor mechanism operatively connected to said roll supporting means and operable automatically to move the same towards and away from said tool holder.

22. In an apparatus for machining the circumferential portions of rolls of the type described, the combination of at least one pair of head-stocks for supporting a roll to be machined, a tool holder rotatable about an axis disposed transversely to the axis of a roll so supported, mechanism operable automatically to move said tool holder radially with respect to the axis of rotation thereof as the tool holder rotates and servo motor mechanism operatively connected to said head-stocks and operable automatically to move the same towards and away from said tool holder.

23. In an apparatus for machining the circumferential portions of rolls of the type described, the combination of two pairs of head-stocks for supporting a pair of rolls to be machined with their axes disposed parallel to one another, feed mechanism operable to move each pair of head-stocks towards and away from the other pair, a tool holder extending between a pair of rolls supported by said head-stocks and rotatable about an axis disposed transversely to the plane extending through the axes of said rolls, mechanism operable automatically to move said tool holder radially with respect to the axis of rotation thereof as said tool holder rotates and servo motor mechanism operatively connected to said feed mechanism for said head-stocks and operable automatically to actuate the same for the purpose described.

24. In an apparatus for machining the circumferential portions of rolls of the type described, the combination of two pairs of head-stocks for supporting a pair of rolls to be machined with their axes disposed parallel to one another, feed mechanism operable to move each pair of head-stocks towards and away from the other pair, a rotatable arbour carrying a tool holder extending between a pair of rolls supported by said head-stocks and rotatable with said arbour about an axis disposed transversely to the plane extending through the axes of said rolls, said tool holder being displaceable on said arbour radially of the axis of rotation thereof, cam actuated mechanism operatively connected to said tool holder and operable automatically to effect radial movements thereof on said arbour as the tool holder rotates and servo-motor mechanism operatively connected to said feed mechanism for said head-stocks and operable automatically to actuate the same for the purpose described.

In testimony whereof I have signed my name to this specification.

HANS SCHIMMEL.